Nov. 11, 1930.  A. CAMPULA  1,781,366

PRESSURE ACTUATED VALVE

Filed Dec. 9, 1929

INVENTOR.
ANTON CAMPULA.
BY John A. Bommhardt
ATTORNEY.

Patented Nov. 11, 1930

1,781,366

UNITED STATES PATENT OFFICE

ANTON CAMPULA, OF GARFIELD HEIGHTS, OHIO

PRESSURE-ACTUATED VALVE

Application filed December 9, 1929. Serial No. 412,810.

This invention relates to pressure-actuated valves particularly adapted for use in high pressure lines carrying air or other gas. It is especially useful in connection with pneumatic tools or the like for the purpose of reducing the flow of air in the event of breakage of the air line, which often causes trouble until a permanent repair can be made, by reason of whipping of the air hose or the like. It thus operates as a safety device for the workman. It also permits taking off one tool and substituting another without shutting off the main air pressure. The valve acts to restrict the flow of the air or other fluid, in the event of any great or sudden reduction in the back pressure, and will reduce loss and waste of air or gas under such conditions. It is also useful in reducing to a minimum danger of explosion or conflagration when using inflammable gases in a pressure system.

To this end, the device comprises a valve which may be placed in the line and which closes in the direction of flow. Normally, the valve is open, but when excessive flow occurs, as by a break in the line beyond the valve, the flow will cause the latter to close, thereby shutting off the flow, except a very small passage at a restricted port in the valve. This action is regulated by means of a spring which normally holds the valve open, but which under excess pressure or velocity yields to permit closure of the main valve.

In the present embodiment of the invention the valve is of the disk type, and is so constructed that dirt, rust or the like cannot lodge; and also, the failure of the regulating spring to act will not prevent the closure of the valve under unsafe conditions.

Figure 1:
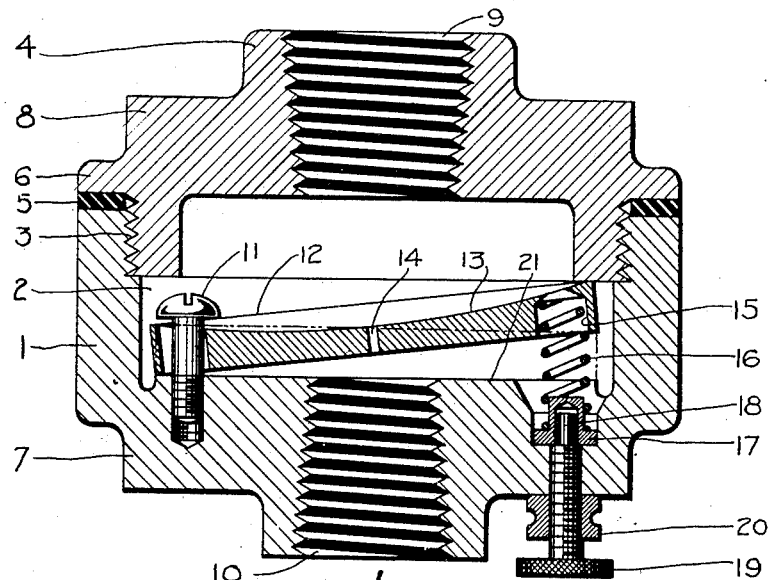
Figure 2:
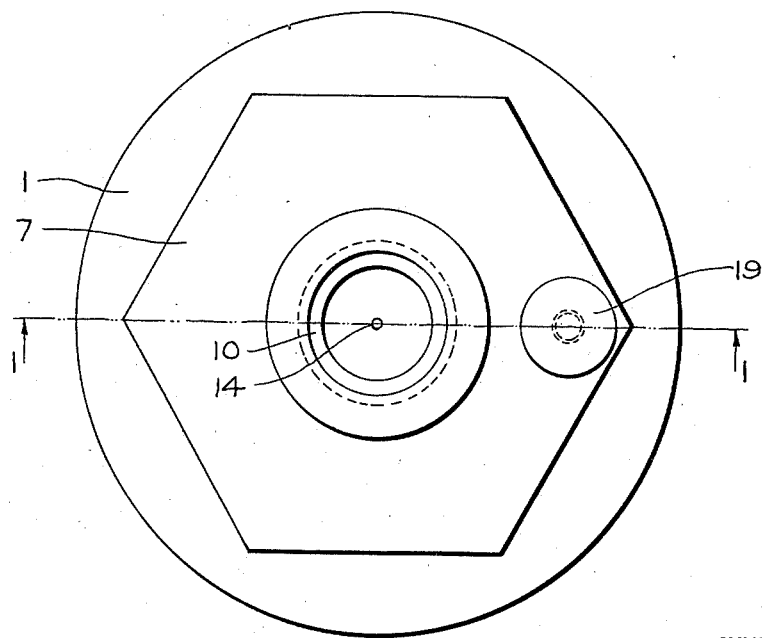

One form of the invention is illustrated in the accompanying drawings in which Fig. 1 is a longitudinal section of the valve on the line 1—1 of Fig. 2. Fig. 2 is a bottom end view of the valve.

In the drawings, the valve casing consists of two parts, a base or body part 1 and a cap or top part 4, screwed together as shown at 3 with a gasket 5 at the joint. Hexagonal or non-circular shoulders 7 and 8 are formed on the members to receive a wrench for coupling or uncoupling the same, and tapped holes 9 and 10 permit the connection of inlet and outlet lines respectively. The cap has a flange 6 under which the gasket 5 is compressed.

The valve consists of a disk 12 adapted to seat against the machined face 21 in the member 1, this disk being loosely attached in place by a screw 11 extending loosely through a hole in the valve near one edge thereof, the hole being large enough to permit the valve to flap to and from its seat. The valve has a small central port 14 to permit the passage of some flow under all conditions, and the upper surface of the valve disk is preferably concave as shown at 13.

At the edge of the valve diametrically opposite the screw 11 a spring 16 is provided, between the valve and the outlet side of the casing, one end of the spring being confined in a recess 15 in the valve disk, and the other end seating against a thimble 17 which rests in a recess bored in the body of the casing, and this thimble receives the reduced end 18 of the screw 19 which is tapped through the member 1 and can be turned to vary the pressure or tension of the spring tending to open the valve. The screw can be fixed at adjustment by a nut 20. The opening movement of the valve is limited by the inner end of the cap 4.

Under normal pressure the valve is held in open position by the spring, and air or other fluid can flow through the same, from the inlet 9 to the outlet 10. If a break or the like occurs beyond the valve an increased velocity or difference of pressure will overcome the strength of the spring and force the valve to closed position, thereby cutting off the flow, except the small amount permitted by the port 14.

The valve is therefore automatic in its operation, acting to close off dangerous or objectionable flow under abnormal conditions, and it will be found very useful in regulating and controlling the supply of air to pneumatic tools or the like, and will prevent fluttering or uneven action of the motors under all conditions.

I claim:

1. A valve comprising a casing, a disk therein loosely connected to the casing near one edge and opening toward the inlet to the casing and adapted to close under abnormal flow, and a spring between the disk and the casing, tending to hold the disk in open position, the disk having a port permitting a restricted flow under all conditions.

2. A valve comprising a two-part casing having a valve seat therein, a valve disk in the casing adapted to close against said seat, a loose connection between one edge of the disk and the casing, a spring between the opposite edge of the disk and the casing, tending to open the disk toward the inlet to the casing, and a screw extending through the casing and bearing against the spring, to adjust the tension thereof.

In testimony whereof, I do affix my signature.

ANTON CAMPULA.